United States Patent
Xia et al.

(10) Patent No.: US 10,190,237 B2
(45) Date of Patent: Jan. 29, 2019

(54) METHOD FOR PREPARING SALT-RESISTANT AND DETERGENT-RESISTANT ALGINATE FIBER

(71) Applicant: QINGDAO UNIVERSITY, Qingdao, Shandong (CN)

(72) Inventors: Yanzhi Xia, Qingdao (CN); Xing Tian, Qingdao (CN); Fangfang Cheng, Qingdao (CN); Bingbing Wang, Qingdao (CN); Fengyu Quan, Qingdao (CN); Quan Ji, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 15/566,918

(22) PCT Filed: Apr. 15, 2016

(86) PCT No.: PCT/CN2016/079429
§ 371 (c)(1),
(2) Date: Oct. 16, 2017

(87) PCT Pub. No.: WO2016/165649
PCT Pub. Date: Oct. 20, 2016

(65) Prior Publication Data
US 2018/0127896 A1    May 10, 2018

(30) Foreign Application Priority Data
Apr. 16, 2015 (CN) ............ 2015 1 0178880

(51) Int. Cl.
*D01F 9/04* (2006.01)
*D06M 11/82* (2006.01)
*C08B 37/00* (2006.01)
*D06M 101/04* (2006.01)

(52) U.S. Cl.
CPC ............ *D01F 9/04* (2013.01); *C08B 37/0084* (2013.01); *D06M 11/82* (2013.01); *D06M 2101/04* (2013.01)

(58) Field of Classification Search
CPC ..... D01F 9/04; D06M 11/82; D06M 2101/04; C08B 37/0084
See application file for complete search history.

(56) References Cited

U.S. PATENT DOCUMENTS 2,477,861 A * 8/1949 Clark ............... C08B 37/0084
536/3

FOREIGN PATENT DOCUMENTS

| CN | 101718010 A | 6/2010 |
| CN | 101922064 A | 12/2010 |
| CN | 101956320 A | 1/2011 |
| CN | 104846625 A | 8/2015 |
| GB | 535058 A | 3/1941 |

OTHER PUBLICATIONS

Jul. 19, 2016 Search Report issued in International Patent Application No. PCT/CN2016/079429.
Jul. 19, 2016 Written Opinion issued in International Patent Application No. PCT/CN2016/079429.
Wang, Heng-zhou et al. " Structure and Properties of Aluminum Sulfate Modified Calcium Alginate Fibers." Textile Auxiliaries, vol. 30, No. 3, Mar. 20, 2013.
Master's thesis of Tianjin University, Jan. 2006.
"Textiles—Domestic washing and drying procedures for textile testing." pp. 54-66, 2001.
"Textiles—Tests for colour fastness—Colour fastness to washing with soap or soap and soda." 2008.
"Textiles—Tear properties of fabrics—Part 2: Determination of tear force of tongue shaped test specimens." pp. 1-10, 1997.
Zhang Chuan-jie et al. "Modification of calcium alginate fibers with aluminum sulfate solution." Journal of Functional Materials, vol. 43(13), pp. 1752-1755, 2012.

\* cited by examiner

*Primary Examiner* — Amina S Khan
(74) *Attorney, Agent, or Firm* — Oliff PLC

(57) ABSTRACT

A method for preparing a salt-resistant and detergent-resistant alginate fiber by contacting and infiltrating a finished alginate fiber with a borate-containing adjuvant solution and using selected proper raw materials in selected proportions and reaction conditions. The preparation method solves the problem that the alginate fiber and a fabric made therefrom are neither salt-resistant nor detergent-resistant. The borate-modified alginate fiber and a fabric made therefrom have excellent salt resistances, and can be washed with an alkaline detergent. The swelling degree of the alginate fiber modified by the adjuvant solution can be reduced to 39.8% after the fiber is immersed in a normal saline at 30° C. for 72 h and can be reduced to 55.3% after the fiber is immersed in a standard detergent for 24 h, while the fiber maintains its original morphology without any obvious dissolution phenomenon, and the self flame-resisting performance of the alginate fiber is also maintained.

5 Claims, No Drawings

METHOD FOR PREPARING SALT-RESISTANT AND DETERGENT-RESISTANT ALGINATE FIBER

TECHNICAL FIELD

The invention belongs to the field of textile chemical technology, and particularly relates to a method for preparing a salt-resistant and detergent-resistant alginate fiber.

BACKGROUND

The alginate fiber is a biodegradable fiber prepared through wet spinning using sodium alginate as the raw material. The alginate fiber is widely applied due to its excellent biodegradability and biocompatibility, great water absorbency and film-forming and fiber-forming capability, and has great potential in applications to high-grade clothing, underwear fabrics and decorative fabrics.

When the alginate fiber currently researched at home and abroad is contacted with a solution containing $Na^+$, $K^+$ and $H^+$ ions, an ion-exchange interaction occurs between these ions and divalent cations contained in the alginate fiber, such that the fiber is swelled to break coordination-crosslinking structures within the alginate fiber, leading to a loss of fiber morphology, and even completely dissolution of the fiber. This defect results in that when the alginate fiber is applied in the textile field, not only is a failure of dyeing and finishing processes of the fiber caused, but also the fabric cannot be washed with a common detergent, which greatly limits the application of the alginate fiber in the textile fabric field.

Although currently there are some reports for researches on salt-resistant alginate fibers in the prior art, some shortages still exist. For example, Chinese patent CN 101956320 A discloses a method for reducing the swelling degree of a calcium alginate fiber, wherein a calcium alginate fiber processed by such a method has a reduced swelling degree in a NaCl solution; there are also some researches on modification of a calcium alginate fiber by aluminum sulfate, and for example Zhang Chuan-jie et al. Modification of calcium alginate fibers with aluminum sulfate solution (*Journal of Functional Materials*, 2012-7, Vol 43(13), 1752-1755) and Wang Heng-zhou et al. Structure and properties of aluminum sulfate modified calcium alginate fibers (Textile Auxiliaries, 2013-3, Vol 30(3), 5-11) reported methods for improving the salt resistance of calcium alginate fibers through modification by aluminum sulfate, and the calcium alginate fibers processed by such methods has a significantly improved resistance to normal saline, but the alginate fibers processed by the aforementioned methods will be dissolved rapidly when coming into contact with a alkaline detergent, such that a fabric made of such an alginate fiber cannot meet the requirement for daily use; Zhang Min et al. from Tianjin University prepared a degradable alginate hydrogel microcarrier for in vitro culture of mesenchymal stem cells by crosslinking oxidized sodium alginate-gelatin with sodium tetraborate (master's thesis of Tianjin University, 2006-1), wherein such a carrier has excellent resistances to salts and alkalis, but the raw material, the finished product and the preparation process of this method are all significantly different from the existing manufacturing processes of alginate fibers, and thus cannot be applied in manufacture of alginate fibers; Chinese patent CN 101718010 B provides a method for preparing an alginate fiber, in which an alginate fiber is prepared directly from alga as a raw material using epichlorohydrin, borax, toluene diisocyanate or a dialdehyde compound as a crosslinking agent, but since the main object of this method is to prepare a fiber product with mechanical properties similar to the existing alginate fiber directly by using alga as the raw material, the effects of impurities contained in the raw material alga on the salt resistance and the detergent resistance of the alginate fiber had been ignored, such that the salt resistance and the detergent resistance, and particularly the detergent resistance, of the alginate fiber cannot meet the application requirements of textile fabrics.

Therefore, it is an urgent technical problem to be solved in the textile field to provide an alginate fiber which is not only salt-resistant, but also detergent-resistant.

SUMMARY

The object of the invention is to provide a method for preparing a salt-resistant and detergent-resistant alginate fiber. The fiber is a salt-resistant and detergent-resistant alginate fiber prepared by incorporating a borate-containing adjuvant and using selected proper raw materials in selected proportions, reaction conditions and the like, and thus the problem that an alginate fiber and a fabric made therefrom are neither salt-resistant nor detergent-resistant is solved. The borate-modified alginate fiber and a fabric made therefrom have excellent salt resistances, and can be washed with an alkaline detergent, and the self flame-resisting performance of the alginate fiber can also be maintained at the same time.

The technical solution of the invention includes:

In a method for preparing a salt-resistant and detergent-resistant alginate fiber, the fiber is obtained by contacting and infiltrating an alginate fiber with an adjuvant solution for 1-300 minutes, washing after the infiltration is completed, and then drying; the adjuvant solution is prepared by dissolving a combination of one or more of boric acid, borate, tetraborate, pentaborate, metaborate or perborate in water; the mass fraction of the adjuvant in the adjuvant solution is 0.1-8%, the alginate fiber is contacted with and infiltrated in the adjuvant solution at a temperature of 10-70° C. for a time period of 1-300 minutes, and the pH value of the adjuvant solution is 8-11; and the mass ratio of the alginate fiber to the adjuvant is 3-100:1.

The aforementioned adjuvants are all inorganic materials which are easily soluble in water, and easy to implement and release no volatile organic compound. The borate adjuvant releases borate ions through hydrolysis, and then the borate ions react with hydroxyl groups on the surface of the alginate fiber to form an interpenetrating network structure. Such a structure can reduce the ion-exchange rate of the alginate and thus maintain the fiber morphology.

As a preferred embodiment of the invention, the aforementioned adjuvant solution includes one or more of boric acid, borate, tetraborate, pentaborate or metaborate; the mass fraction of the adjuvant in the aforementioned adjuvant solution is 0.3-6%, the alginate fiber is contacted with and infiltrated in the adjuvant solution at a temperature of 40-70° C.; and the mass ratio of the aforementioned alginate fiber to the adjuvant is 3-50:1.

As another preferred embodiment of the invention, the aforementioned adjuvant solution includes one or more of potassium tetraborate, sodium metaborate, boric acid or pentaborate; the mass fraction of the adjuvant in the aforementioned adjuvant solution is 0.3-4%; the alginate fiber is contacted with and infiltrated in the adjuvant solution at a temperature of 50-55° C.; and the mass ratio of the aforementioned alginate fiber to the adjuvant is 20-50:1.

Further, the aforementioned alginate fiber is a finished alginate fiber, or a semi-finished alginate fiber after the fiber is removed from a coagulating bath and before the fiber is coated by a glazing agent, or a fabric containing the alginate fiber, wherein the alginate fiber is a calcium alginate fiber, a zinc alginate fiber, a lead alginate fiber, a copper alginate fiber or an aluminum alginate fiber. Further, the pH value of the aforementioned adjuvant solution is adjusted by using sodium hydroxide, potassium hydroxide, ammonium hydroxide, sodium carbonate, potassium carbonate, sodium bicarbonate or potassium bicarbonate as a conditioning agent.

The method of the invention encompasses all of means for obtaining a boron-containing alginate fiber by surface processing an alginate fiber and a fabric containing the alginate after a coagulating bath.

Beneficial effects brought about by the invention are as follows:

The invention provides a method for preparing a salt-resistant and detergent-resistant alginate fiber. As compared with the existing alginate fiber and the fabric made therefrom, for example as compared with CN 101956320A in which an organic aldehyde or epoxy compound accounting for 0.5%-10% of the fiber mass is added to the calcium alginate fiber for a crosslinking reaction, so that the swelling degree is reduced through partial or complete sealing of calcium ions contained in the calcium alginate fiber via the crosslinking relationship established between the sodium alginate fiber and associated chemical materials, the invention adopts an inorganic salt in place of the organic material to crosslink the alginate fiber, which avoids the addition of the organic agent and makes the manufacturing process and the product itself more environment friendly.

For example, CN 101718010A discloses a method for preparing an alginate fiber, which includes firstly processing the alga raw material, then adding the processed material into a digestion solution for digesting, filtering the digested solution, and spinning by using the filtrate as the spinning solution, wherein a crosslinking agent, such as sodium borate or toluene diisocyanate, is added during the digestion process to form a crosslinking structure in the alga raw material, thereby improving the viscosity of the spinning solution and improving the spinnability of the alga raw material, while in the invention, crosslinking is carried out on the surface of the alginate fiber by regulating the proportion of borate and reaction conditions, wherein the crosslinking functions to form a protective layer on the surface of the alginate fiber, for the purpose of reducing the cation exchange of the alginate fiber, particularly on the surface layer of the alginate fiber.

The alginate fiber of the invention has an excellent salt resistance, and can be washed with an alkaline detergent. In the invention, The swelling degree of the alginate fiber modified by the adjuvant solution can be reduced to 39.8% after the fiber is immersed in a normal saline at 30° C. for 72 h and can be reduced to 55.3% after the fiber is immersed in a standard detergent for 24 h, while the fiber maintains its original morphology without any obvious dissolution phenomenon. For a fabric made of an alginate fiber processed by the method of the invention, after being immersed in normal saline and a standard detergent, the fabric still has an intact structure, and the mechanical properties thereof are not significantly decreased.

DETAILED DESCRIPTION

The invention provides a method for preparing a salt-resistant and detergent-resistant alginate fiber, and in order to make advantages and technical solutions of the invention clearer and more apparent, the invention is further described hereafter in connection with specific examples.

In the following examples 1-7, the alginate fiber modified by infiltration in an adjuvant was tested for the salt resistance of the alginate fiber according to the swelling-degree variations of the fiber after being immersed in a 30% (o.w.f) NaCl solution with a mass fraction of 0.9% at 30° C. for 72 h, with reference to GB/T8629-2001 and GB/T 3921-2008 standards;

the alginate fiber was tested for its detergent resistance according to the swelling-degree variations of the fiber after being immersed in a 30% (o.w.f) standard detergent solution (a AATCC1993 standard detergent, a non-phosphorus ECE standard detergent, a non-phosphorus IEC standard detergent, and a soap flake specific to fabric test) at 20° C. for 24 h, and the swelling-degree variations of a cotton fiber and a polyester fiber under the same conditions are used for comparison with that of the alginate fiber; and a knitted fabric made of the calcium alginate fiber (50% of alginate fiber, 50% of cotton, and unsized) was modified, and the modified alginate-fiber knitted fabric was immersed in a solution with the aforementioned conditions, and with reference to GB/T3917.2-1997 *Textiles—tear properties of fabrics—Part 2: determination of tear force of tongue shaped test specimens*, a trouser shaped test specimen is tested on a YG(B)026H-250 type fabric strength tester for determination of tear forces of the alginate-fiber knitted fabric before and after the immersion.

Example 1

(1) Preparation of Boric-Acid Immersion Solution when the Boric Acid Solution (Immersion Solution) was Selected as the Adjuvant 8 g of boric acid was dissolved in deionized water to formulate a 400 g immersion solution, and heated to 70° C., and the pH value of the solution was adjusted to 8 by adding $Na_2CO_3$;

(2) Preparation of Boric-Acid-Modified Alginate Fiber 40 g of calcium alginate fiber was immersed into the boric-acid immersion solution obtained by step (1) for 10 minutes, and then the immersed alginate fiber was washed with deionized water, and dried to obtain a boric-acid-modified alginate fiber.

Table 1 is a collection of fiber swelling-degree data for the modified alginate fiber prepared in this example.

TABLE 1

| Specimen | Pure Alginate Fiber | Boric-Acid-Modified Alginate Fiber | Comparison | Cotton Fiber | Polyester Fiber |
| --- | --- | --- | --- | --- | --- |
| NaCl Solution | 373.4% | 45.8% | −87.7% | 54.1% | 51.7% |
| AATCC1993 Standard Detergent | — | 76.1% | | 62.6% | 69.8% |

TABLE 1-continued

| Specimen | Pure Alginate Fiber | Boric-Acid-Modified Alginate Fiber | Comparison | Cotton Fiber | Polyester Fiber |
|---|---|---|---|---|---|
| Non-Phosphorus ECE Standard Detergent | — | 63.2% | | 60.5% | 65.1% |
| Non-Phosphorus IEC Standard Detergent | — | 64.7% | | 61.2% | 64.8% |
| Soap Flake Specific to Fabric Test | — | 83.6% | | 62.8% | 70.4% |

*: "—" represents being dissolved, with the same meaning in the following tables.

Example 2

(1) Preparation of Sodium-Tetraborate Immersion Solution when the Sodium Tetraborate Solution (Immersion Solution) was Selected as the Adjuvant 0.5 g of sodium tetraborate was dissolved in deionized water to formulate a 500 g immersion solution, and heated to 50° C., and the pH value of the solution was adjusted to 10 by adding NaOH;

(2) Preparation of Sodium-Tetraborate-Modified Alginate Fiber 50 g of lead alginate fiber was immersed into the sodium-tetraborate immersion solution obtained by step (1) for 300 minutes, and then the immersed alginate fiber was washed with deionized water, and dried to obtain a sodium-tetraborate-modified alginate fiber with the swelling-degree test data as shown in table 2.

TABLE 2

| Specimen | Pure Alginate Fiber | Sodium-Tetraborate-Modified Alginate Fiber | Comparison | Cotton Fiber | Polyester Fiber |
|---|---|---|---|---|---|
| NaCl Solution | 373.4% | 102.7% | −70.4% | 54.1% | 51.7% |
| AATCC1993 Standard Detergent | — | 126.5% | | 62.6% | 69.8% |
| Non-Phosphorus ECE Standard Detergent | — | 115.4% | | 60.5% | 65.1% |
| Non-Phosphorus IEC Standard Detergent | — | 113.0% | | 61.2% | 64.8% |
| Soap Flake Specific to Fabric Test | — | 136.1% | | 62.8% | 70.4% |

Example 3

(1) Preparation of Ammonium-Pentaborate Immersion Solution when the Ammonium Pentaborate Solution (Immersion Solution) was Selected as the Adjuvant Solution:

1 kg of ammonium pentaborate was dissolved in deionized water to formulate a 35 kg immersion solution, and heated to 60° C., and the pH value of the solution was adjusted to 9 by adding ammonium hydroxide;

(2) Preparation of Ammonium-Pentaborate-Modified Alginate Fiber 5 kg of zinc alginate fiber was immersed into the ammonium-pentaborate immersion solution obtained by step (1) for 20 minutes, and then the immersed alginate fiber was washed with deionized water, and dried to obtain an ammonium-pentaborate-modified alginate fiber with the swelling-degree test data as shown in table 3.

TABLE 3

| Specimen | Pure Alginate Fiber | Ammonium-Pentaborate-Modified Alginate Fiber | Comparison | Cotton Fiber | Polyester Fiber |
|---|---|---|---|---|---|
| NaCl Solution | 373.4% | 75.5% | −89.0% | 54.1% | 51.7% |
| AATCC1993 Standard Detergent | — | 92.3% | | 62.6% | 69.8% |
| Non-Phosphorus ECE Standard Detergent | — | 87.1% | | 60.5% | 65.1% |
| Non-Phosphorus IEC Standard Detergent | — | 86.5% | | 61.2% | 64.8% |
| Soap Flake Specific to Fabric Test | — | 104.8% | | 62.8% | 70.4% |

Example 4

(1) Preparation of Composite Immersion Solution when a Composite Solution (Immersion Solution) of a Combination of Potassium Tetraborate, Sodium Metaborate and Boric Acid Dissolved in Water was Selected as the Adjuvant Solution:

10 g of potassium tetraborate, 5 g of sodium metaborate and 5 g of boric acid were dissolved in deionized water to formulate a 500 g immersion solution, and heated to 50° C., and the pH value of the solution was adjusted to 10 by adding KOH;

(2) Preparation of Modified Composite Alginate Fiber 200 g of zinc alginate fiber was immersed into the composite immersion solution obtained by step (1) for 10 minutes, and then the immersed alginate fiber was washed with deionized water, and dried to obtain a modified composite alginate fiber with the swelling-degree test data as shown in table 4.

TABLE 4

| Specimen | Pure Alginate Fiber | modified composite Alginate Fiber | Comparison | Cotton Fiber | Polyester Fiber |
| --- | --- | --- | --- | --- | --- |
| NaCl Solution | 373.4% | 39.8% | −89.0% | 54.1% | 51.7% |
| AATCC1993 Standard Detergent | — | 68.4% | | 62.6% | 69.8% |
| Non-Phosphorus ECE Standard Detergent | — | 57.8% | | 60.5% | 65.1% |
| Non-Phosphorus IEC Standard Detergent | — | 55.3% | | 61.2% | 64.8% |
| Soap Flake Specific to Fabric Test | — | 70.6% | | 62.8% | 70.4% |

Example 5

(1) Preparation of Potassium-Metaborate Immersion Solution when the Potassium Metaborate Solution (Immersion Solution) was Selected as the Adjuvant Solution:

60 g of potassium metaborate was dissolved in deionized water to formulate a 1 kg immersion solution, and heated to 40° C., and the pH value of the solution was adjusted to 11 by adding KHCO$_3$;

(2) Preparation of Potassium-Metaborate-Modified Alginate Fiber 180 g of copper alginate fiber was immersed into the potassium-metaborate immersion solution obtained by step (1) for 1 minute, and then the immersed alginate fiber was washed with deionized water, and dried to obtain a potassium-metaborate-modified alginate fiber with the swelling-degree test data as shown in table 5.

TABLE 5

| Specimen | Pure Alginate Fiber | Potassium-Metaborate-Modified Alginate Fiber | Comparison | Cotton Fiber | Polyester Fiber |
| --- | --- | --- | --- | --- | --- |
| NaCl Solution | 373.4% | 61.9% | −82.5% | 54.1% | 51.7% |
| AATCC1993 Standard Detergent | — | 88.3% | | 62.6% | 69.8% |
| Non-Phosphorus ECE Standard Detergent | — | 72.5% | | 60.5% | 65.1% |
| Non-Phosphorus IEC Standard Detergent | — | 71.7% | | 61.2% | 64.8% |
| Soap Flake Specific to Fabric Test | — | 95.9% | | 62.8% | 70.4% |

Example 6

(1) Preparation of Sodium-Perborate Immersion Solution when the Sodium Perborate Solution (Immersion Solution) was Selected as the Adjuvant Solution:

16 g of sodium perborate was dissolved in deionized water to formulate a 200 g immersion solution, and heated to 70° C., and the pH value of the solution was adjusted to 10 by adding ammonium hydroxide;

(2) Preparation of Sodium-Perborate-Modified Alginate Fiber 80 g of aluminum alginate fiber was immersed into the sodium-perborate immersion solution obtained by step (1) for 20 minutes, and then the immersed alginate fiber was washed with deionized water, and dried to obtain a sodium-perborate-modified alginate fiber with the swelling-degree test data as shown in table 6.

TABLE 6

| Specimen | Pure Alginate Fiber | Sodium-Perborate-Modified Alginate Fiber | Comparison | Cotton Fiber | Polyester Fiber |
|---|---|---|---|---|---|
| NaCl Solution | 373.4% | 68.3% | −35.2% | 54.1% | 51.7% |
| AATCC1993 Standard Detergent | — | 94.5% |  | 62.6% | 69.8% |
| Non-Phosphorus ECE Standard Detergent | — | 81.8% |  | 60.5% | 65.1% |
| Non-Phosphorus IEC Standard Detergent | — | 79.0% |  | 61.2% | 64.8% |
| Soap Flake Specific to Fabric Test | — | 99.6% |  | 62.8% | 70.4% |

Example 7

(1) The Adjuvant Solution is Selected as being Prepared from a Mixture of Sodium Tetraborate, Sodium Metaborate and Boric Acid, and the Particular Preparation Method is as Follows:

25 g of potassium tetraborate, 15 g of sodium metaborate and 10 g of boric acid were dissolved in deionized water to formulate a 1 kg immersion solution, and heated to 40° C., and the pH value of the solution was adjusted to 10 by adding NaOH;

(2) Preparation of Composite Modified Fabric Made of Alginate Fiber

A 200 g knitted fabric made of calcium alginate fiber was immersed into the composite immersion solution obtained by step (1) for 10 minutes, and then the immersed alginate fiber was washed with deionized water, and dried to obtain a modified composite fabric made of alginate fiber. Tear-force data of the knitted fabric is as shown in table 7.

TABLE 7

| Specimen | Knitted Fabric Made of Pure Alginate Fiber, N/mm | | | Knitted Fabric Made of Modified Composite Alginate Fiber, N/mm | | |
|---|---|---|---|---|---|---|
|  | Before Immersing | After Immersing | Comparison | Before Immersing | After Immersing | Comparison |
| NaCl Solution | 21.3 | 15.2 | −28.6% | 21.8 | 20.9 | −4.1% |
| AATCC1993 Standard Detergent | 21.3 | 13.9 | −34.7% | 21.8 | 19.8 | −9.2% |
| Non-Phosphorus ECE Standard Detergent | 21.3 | 14.5 | −31.9% | 21.8 | 20.3 | −6.9% |
| Non-Phosphorus IEC Standard Detergent | 21.3 | 14.7 | −31.0% | 21.8 | 203 | −6.9% |
| Soap Flake Specific to Fabric Test | 21.3 | 13.1 | −38.5% | 21.8 | 19.4 | −11.0% |

Example 8

(1) The Adjuvant Solution is Selected as being Prepared from a Mixture of Sodium Tetraborate, Ammonium Pentaborate and Boric Acid, and the Particular Preparation Method is as Follows:

5 g of potassium tetraborate, 5 g of ammonium pentaborate and 5 g of boric acid were dissolved in deionized water to formulate a 5 kg immersion solution, and heated to 55° C., and the pH value of the solution was adjusted to 9.5 by adding NaOH;

(2) Preparation of Composite Modified Fabric Made of Alginate Fiber

A 750 g knitted fabric made of calcium alginate fiber was immersed into the composite immersion solution obtained by step (1) for 180 minutes, and then the immersed alginate fiber was washed with deionized water, and dried to obtain a modified composite fabric made of alginate fiber. Tear-force data of the knitted fabric is as shown in table 8.

TABLE 8

| Specimen | Knitted Fabric Made of Pure Alginate Fiber, N/mm | | | Knitted Fabric Made of Modified Composite Alginate Fiber, N/mm | | |
|---|---|---|---|---|---|---|
| | Before Immersing | After Immersing | Comparison | Before Immersing | After Immersing | Comparison |
| NaCl Solution | 21.3 | 15.2 | −28.6% | 22.6 | 22.0 | −2.7% |
| AATCC1993 Standard Detergent | 21.3 | 13.9 | −34.7% | 22.6 | 21.2 | −6.2% |
| Non-Phosphorus ECE Standard Detergent | 25.3 | 14.5 | −31.9% | 22.6 | 21.8 | −3.5% |
| Non-Phosphorus IEC Standard Detergent | 21.3 | 14.7 | −31.0% | 22.6 | 21.7 | −4.0% |
| Soap Flake Specific to Fabric Test | 21.3 | 13.1 | −38.5% | 22.6 | 20.5 | −9.3% |

Example 9

(1) Preparation of Ammonium-Pentaborate Immersion Solution when the Ammonium Pentaborate Solution (Immersion Solution) was Selected as the Adjuvant Solution:

5 g of ammonium pentaborate was dissolved in deionized water to formulate a 2 kg composite immersion solution, and heated to 45° C., and the pH value of the solution was adjusted to 9 by adding ammonium hydroxide;

(2) Preparation of Composite Modified Fabric Made of Alginate Fiber

A 400 g knitted fabric made of calcium alginate fiber was immersed into the composite immersion solution obtained by step (1) for 240 minutes, and then the immersed alginate fiber was washed with deionized water, and dried to obtain a modified composite fabric made of alginate fiber. Tear-force data of the knitted fabric is as shown in table 9.

TABLE 9

| Specimen | Knitted Fabric Made of Pure Alginate Fiber, N/mm | | | Knitted Fabric Made of Modified Composite Alginate Fiber, N/mm | | |
|---|---|---|---|---|---|---|
| | Before Immersing | After Immersing | Comparison | Before Immersing | After Immersing | Comparison |
| NaCl Solution | 21.3 | 15.2 | −28.6% | 22.1 | 21.1 | −4.4% |
| AATCC1993 Standard Detergent | 21.3 | 13.9 | −34.7% | 22.1 | 20.3 | −8.0% |
| Non-Phosphorus ECE Standard Detergent | 21.3 | 14.5 | −31.9% | 22.1 | 20.9 | −5.3% |
| Non-Phosphorus IEC Standard Detergent | 21.3 | 14.7 | −31.0% | 22.1 | 20.9 | −5.3% |
| Soap Flake Specific to Fabric Test | 21.3 | 13.1 | −38.5% | 22.1 | 19.7 | −10.6% |

The invention claimed is:

1. A method for preparing a salt-resistant and detergent-resistant alginate fiber, wherein the fiber is obtained by contacting and infiltrating an alginate fiber with an adjuvant solution for 1-300 minutes, washing after the infiltration is completed, and then drying; the adjuvant solution is prepared by dissolving a combination of one or more of boric acid, borate, tetraborate, pentaborate, metaborate or perborate in water; the mass fraction of the adjuvant in the adjuvant solution is 0.1-8%, the alginate fiber is contacted with and infiltrated in the adjuvant solution at a temperature of 10-70° C. for a time period of 1-300 minutes, and the pH value of the adjuvant solution is 8-11; and the mass ratio of the alginate fiber to the adjuvant is 3-100:1.

2. The method for preparing a salt-resistant and detergent-resistant alginate fiber of claim 1, wherein the adjuvant solution comprises one or more of boric acid, borate, tetraborate, pentaborate or metaborate; the mass fraction of the adjuvant in the adjuvant solution is 0.3-6%, the alginate fiber is contacted with and infiltrated in the adjuvant solution at a temperature of 40-70° C.; and the mass ratio of the alginate fiber to the adjuvant is 3-50:1.

3. The method for preparing a salt-resistant and detergent-resistant alginate fiber of claim 2, wherein the adjuvant solution comprises one or more of potassium tetraborate, sodium metaborate, boric acid or pentaborate; the mass fraction of the adjuvant in the adjuvant solution is 0.3-4%; the alginate fiber is contacted with and infiltrated in the adjuvant solution at a temperature of 50-55° C.; and the mass ratio of the alginate fiber to the adjuvant is 20-50:1.

4. The method for preparing a salt-resistant and detergent-resistant alginate fiber of claim 1, wherein the alginate fiber is a finished alginate fiber, or a semi-finished alginate fiber after the fiber is removed from a coagulating bath and before the fiber is coated by a glazing agent, or a fabric containing the alginate fiber, wherein the alginate fiber is a calcium alginate fiber, a zinc alginate fiber, a lead alginate fiber, a copper alginate fiber or an aluminum alginate fiber.

5. The method for preparing a salt-resistant and detergent-resistant alginate fiber of claim 1, wherein the pH value of the adjuvant solution is adjusted by using sodium hydroxide, potassium hydroxide, ammonium hydroxide, sodium carbonate, potassium carbonate, sodium bicarbonate or potassium bicarbonate as a conditioning agent.

* * * * *